(12) United States Patent
Cole et al.

(10) Patent No.: US 7,252,323 B2
(45) Date of Patent: Aug. 7, 2007

(54) VEHICLE BODY

(75) Inventors: Brian Cole, Ann Arbor, MI (US); Mark Kaiser, Jenison, MI (US); Dean Trexel, Spring Lake, MI (US); Hitendra Gadhiya, Auburn Hills, MI (US); Jagmail Singh Cheema, Windsor (CA)

(73) Assignees: Mitsubishi Jidosha Kogyo Kabushiki Kaisha, Tokyo (JP); Johnson Controls Incorporated, Holland, MI (US)

( * ) Notice: Subject to any disclaimer, the term of this patent is extended or adjusted under 35 U.S.C. 154(b) by 28 days.

(21) Appl. No.: 11/319,431

(22) Filed: Dec. 29, 2005

(65) Prior Publication Data

US 2007/0152468 A1   Jul. 5, 2007

(51) Int. Cl.
*B60J 7/20* (2006.01)
(52) U.S. Cl. .............................. 296/107.08; 296/136.05
(58) Field of Classification Search ........... 296/107.08, 296/136.05, 136.06
See application file for complete search history.

(56) References Cited

U.S. PATENT DOCUMENTS 6,508,504 B1 * 1/2003 Conradt et al. ........ 296/136.06
6,644,715 B1   11/2003 Bohnke
7,032,947 B2 * 4/2006 Queveau et al. ......... 296/24.44

FOREIGN PATENT DOCUMENTS

JP   9-164847 A   6/1997

* cited by examiner

*Primary Examiner*—Joseph D. Pape
(74) *Attorney, Agent, or Firm*—Birch, Stewart, Kolasch & Birch, LLP

(57) ABSTRACT

A vehicle body includes a first door member and an opening/closing mechanism. The first door member can rotate between a first position in which it covers the part of a opening of a storage section and a second position in which it opens the part of the opening. The opening/closing mechanism that rotates the first door member includes a rotation shaft that supports the first door member. The rotation shaft is disposed at a position in which the first door member does not come out from a rotation area overlapping the first door member that is in the first position vertically when the first door member rotates. The opening/closing mechanism moves the first door member up to a third position in which the first door member does not interfere with a vehicle main body when the first door member rotates between the first position and the second position.

7 Claims, 14 Drawing Sheets

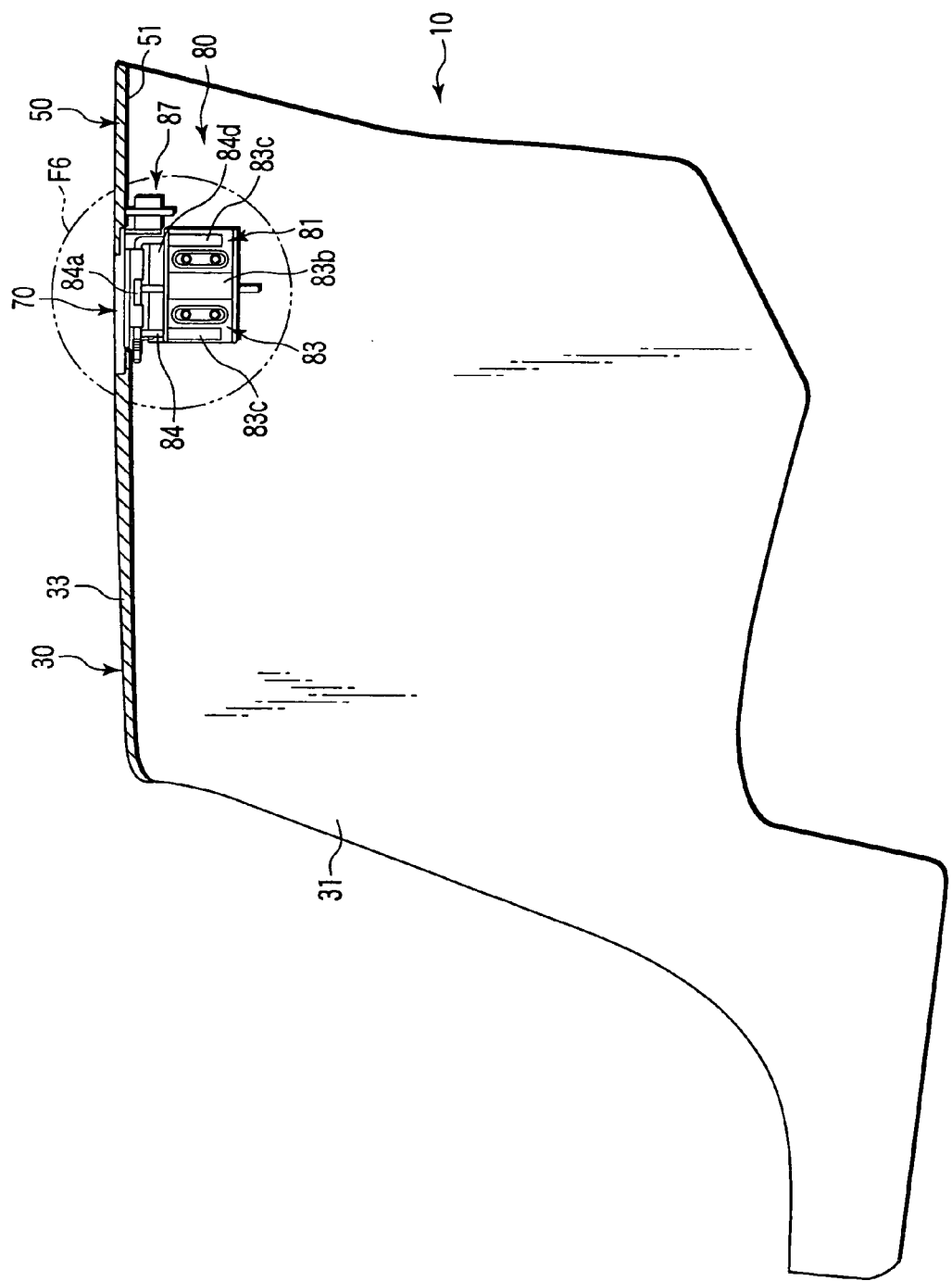
F I G. 5

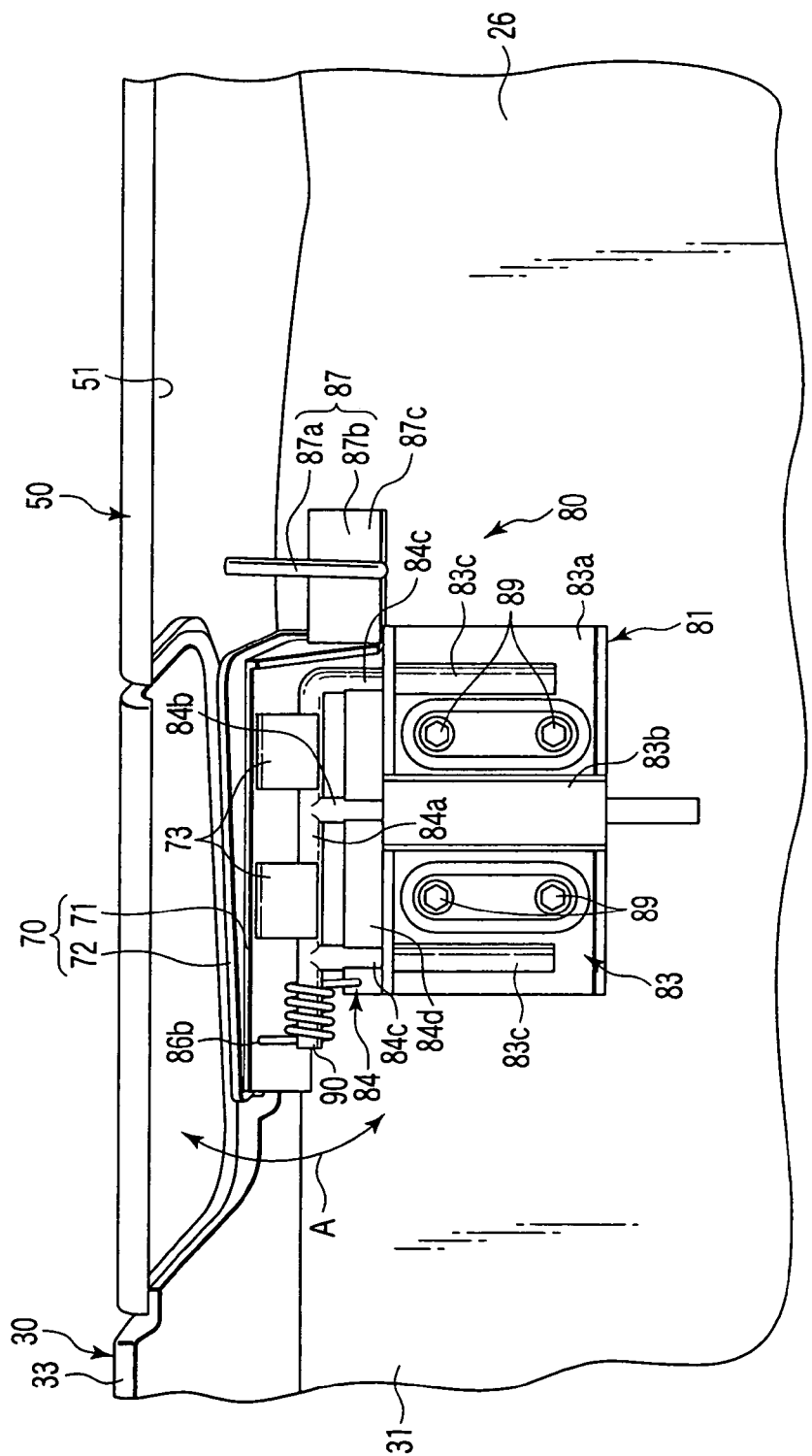
F I G. 6

VEHICLE BODY

BACKGROUND OF THE INVENTION

1. Field of the Invention

The present invention relates to a vehicle body of a convertible type car.

2. Description of the Related Art

The vehicle body of the convertible type car includes a hood member which covers the top of its vehicle compartment and can be folded down. A storage section for accommodating the hood member is formed in the rear section of the vehicle body. In a condition in which the hood member is folded, the hood member is accommodated in the storage section.

The storage section has an opening. The opening extends up to a quarter trim section of the vehicle body. When the hood member is expanded, that is, the hood member covers the top of the vehicle compartment, part of the hood member comes out through the opening formed in the quarter trim section.

The opening formed in the quarter trim section is provided with a door member. The door member opens/closes the opening. After the hood member is accommodated in the storage section, the door member covers the opening.

This kind of the door member is supported by hinges on the vehicle body through ends thereof and rotates around a hinge so as to open/close the opening. When the door member rotates around the hinge so that the opening is opened, the door member is accommodated within the quarter trim section through the opening. Such a vehicle body is disclosed in, for example, Jpn. Pat. Appln. KOKAI Publication No. 9-164847.

As a supporting structure for the door member, a structure provided with plural levers is provided. An end of each lever is supported rotatably on the vehicle body. The door member is supported rotatably on the other end of each lever. When each lever is erected to the vehicle body, the door member rotates relative to the lever so as to open the opening. Such a vehicle body is disclosed in, for example, U.S. Pat. No. 6,644,715B1.

According to the supporting structure of the door member disclosed in Jpn. Pat. Appln. KOKAI Publication No. 9-164847, the door member rotates from a position for closing the opening and then is accommodated within the quarter trim section. For this reason, when the door member rotates, it is necessary to consider providing a space in the interior of the quarter trim section or the like for the door member not to interfere with the surrounding.

Further, according to the supporting structure of the door member disclosed in U.S. Pat. No. 6,644,715B1, each lever rotates to the vehicle body and at the same time, the door member rotates to each lever. Thus, it is estimated that a range in which the door member moves becomes relatively wide.

As a result, it can be considered that when the door member opens the opening, the door member interferes with the surrounding because of invasion of part of the door member into the vehicle compartment or the like.

As described above, according to the supporting structures of the door members described in Jpn. Pat. Appln. KOKAI Publication No. 9-164847 and U.S. Pat. No. 6,644,715B1, it can be considered that when the opening is opened/closed, the door member interferes with the surrounding.

Thus, an object of the present invention is to provide a vehicle body capable of suppressing an interference of a first door member with the surrounding when the opening of the storage section is opened/closed.

BRIEF SUMMARY OF THE INVENTION

The vehicle body of the present invention comprises a vehicle main body, a hood member, a first door member, and an opening/closing mechanism. The vehicle main body comprises a vehicle compartment and storage section. A top of the vehicle compartment is opened. The storage section has an opening. The hood member covers the top of the vehicle compartment such that it is capable of opening/closing. When the top of the vehicle compartment is opened, the hood member is accommodated into the storage section via the opening. The first door member covers at least part of the opening. The first door member can rotate between a first position and a second position. The first position is a position in which the door member covers part of the opening. The second position is a position in which the first door member stands from the vehicle main body and at the same time, opens part of the opening. The opening/closing mechanism rotates the first door member. The opening/closing mechanism has a rotation shaft that supports the first door member rotatably. The rotation shaft is disposed at a position in which the first door member does not come out from a rotation area overlapping, in vertical direction, the first door member that is in the first position when the first door member rotates between the first position and the second position. The rotation shaft moves to a third position in which the first door member does not interfere with the vehicle main body when the first door member rotates between the first position and the second position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a side view of a quarter trim inner shown in FIG. 2 as seen from outside;

FIG. 6 is a perspective view showing the range of F6 shown in FIG. 5 in enlargement;

DETAILED DESCRIPTION OF THE INVENTION

Figure 1:
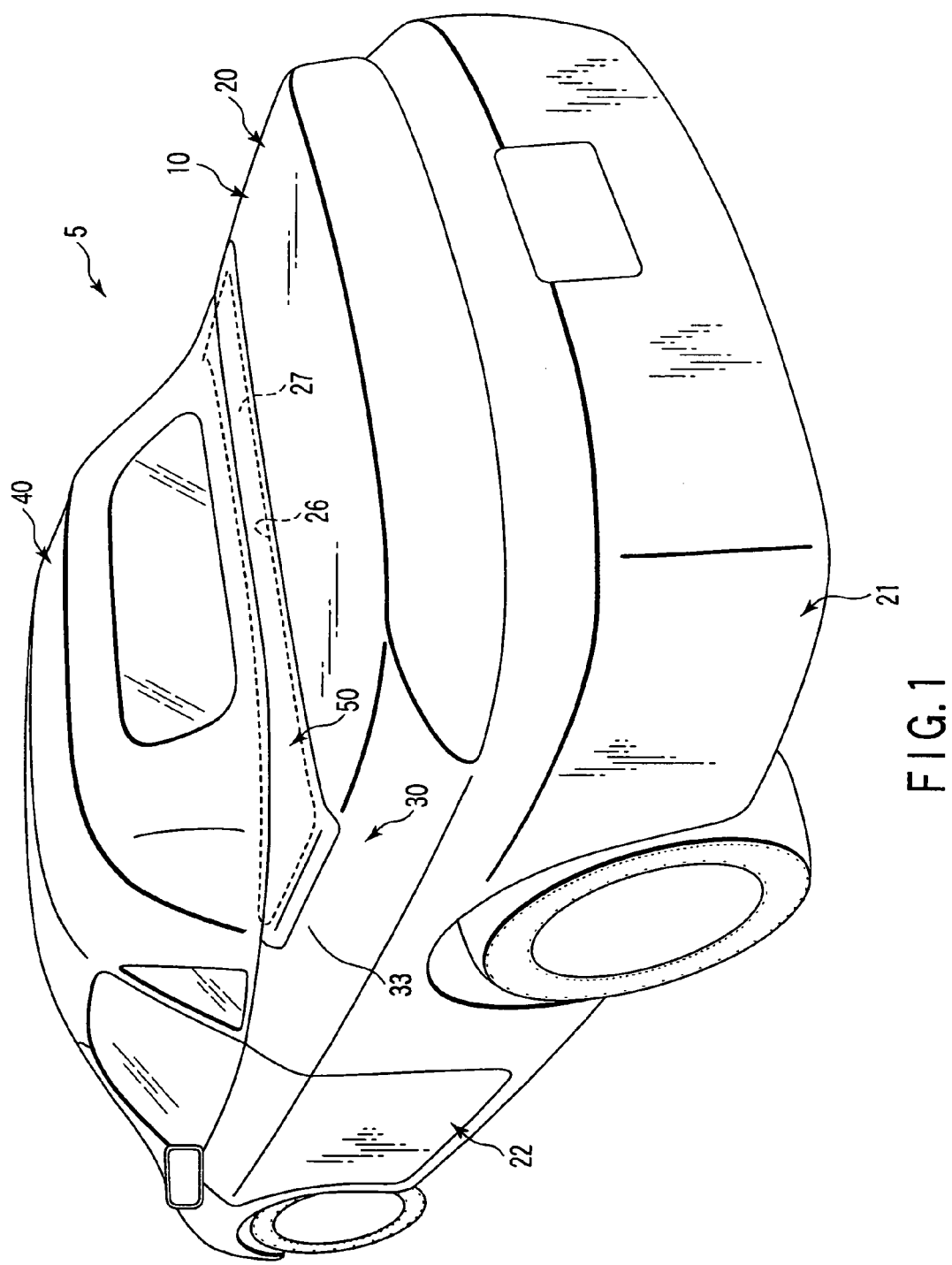
FIG. 1 is a perspective view showing a vehicle body according to an embodiment of the present invention.

A vehicle body according to an embodiment of the present invention will be described with reference to FIGS. 1 to 14. FIG. 1 shows a vehicle body 10 of an automobile 5. The vehicle body 10 is a convertible type. FIG. 1 is a rear view of the vehicle body 10.

The vehicle body 10 includes a vehicle main body 20, a hood member 40, a tonneau garnish 50, a main door 60, a double action flipper door 70 and an opening/closing mechanism 80.

The vehicle main body 20 is a concept of an object considered by depriving the vehicle body 10 of the hood member 40 described later, the tonneau garnish 50 described later, the main door 60, the double action flipper door 70 and the opening/closing mechanism 80.

The vehicle main body 20 includes a frame, exterior, passenger door member 22 and the like. The frame is not shown here. The exterior includes a rear bumper 21, a front fender 23 and the like.

Figure 2:
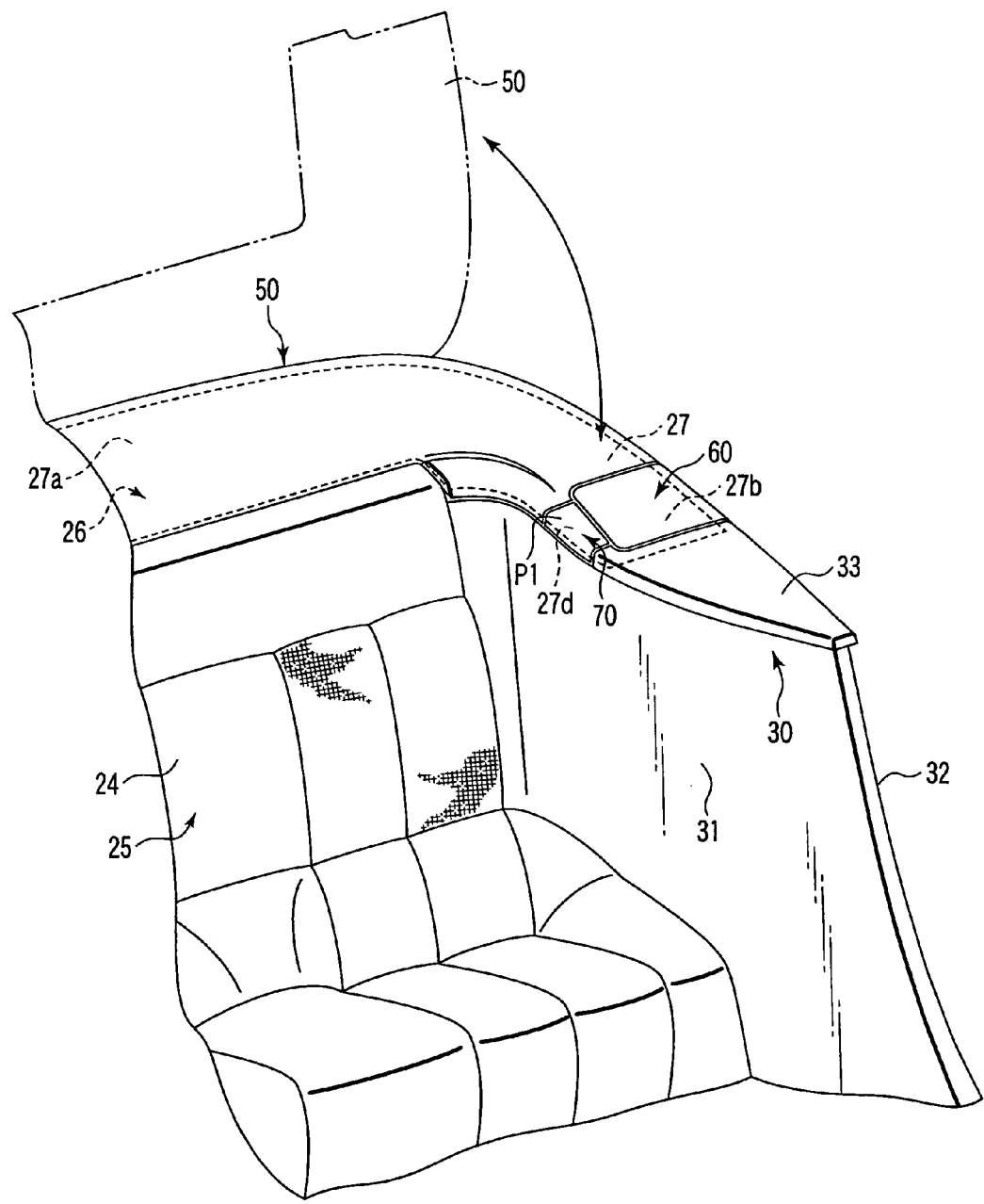
FIG. 2 is a perspective view of the rear section of a vehicle compartment provided in the vehicle body shown in FIG. 1 as seen from inside to outside.

The vehicle main body 20 contains a vehicle compartment 24. FIG. 2 shows the interior of the vehicle compartment 24. FIG. 2 shows the rear section of the vehicle compartment 24 as seen from inside to outside. As shown in FIG. 2, a rear seat 25 is provided at the rear section of the vehicle compartment 24.

In the vehicle main body 20, the top of the vehicle compartment 24 is open. FIG. 1 shows a condition in which the top of the vehicle compartment 24 is covered with the hood member 40 described later.

As indicated by the dotted line in the FIG. 2, a storage section 26 is formed backward of the vehicle compartment 24 in the vehicle main body 20. The storage section 26 is a space section expanding within the vehicle main body 20.

The storage section 26 has an opening 27. The opening 27 is opened outward of the vehicle main body 20. The opening 27 is formed in a range from the rearward of the vehicle compartment 24 up to both sides of the rear seat 25 in the vehicle main body 20.

The opening 27 of the storage section 26 has a first range 27a, a second range 27b and a third range 27d. The first range 27a is a range located substantially in the back of the vehicle compartment 24 of the opening 27. The second range 27b is located outside of a range adjacent to the rear seat 25 in the vehicle width direction of the opening 27. The third range 27d is located inside of the range adjacent to the rear seat 25 in the vehicle width direction of the opening 27.

FIG. 2 shows the left rear section of the vehicle main body 20. The structure of the right rear section of the vehicle main body 20 may be substantially the same as the structure of the left rear section of the vehicle main body 20.

Figure 3:
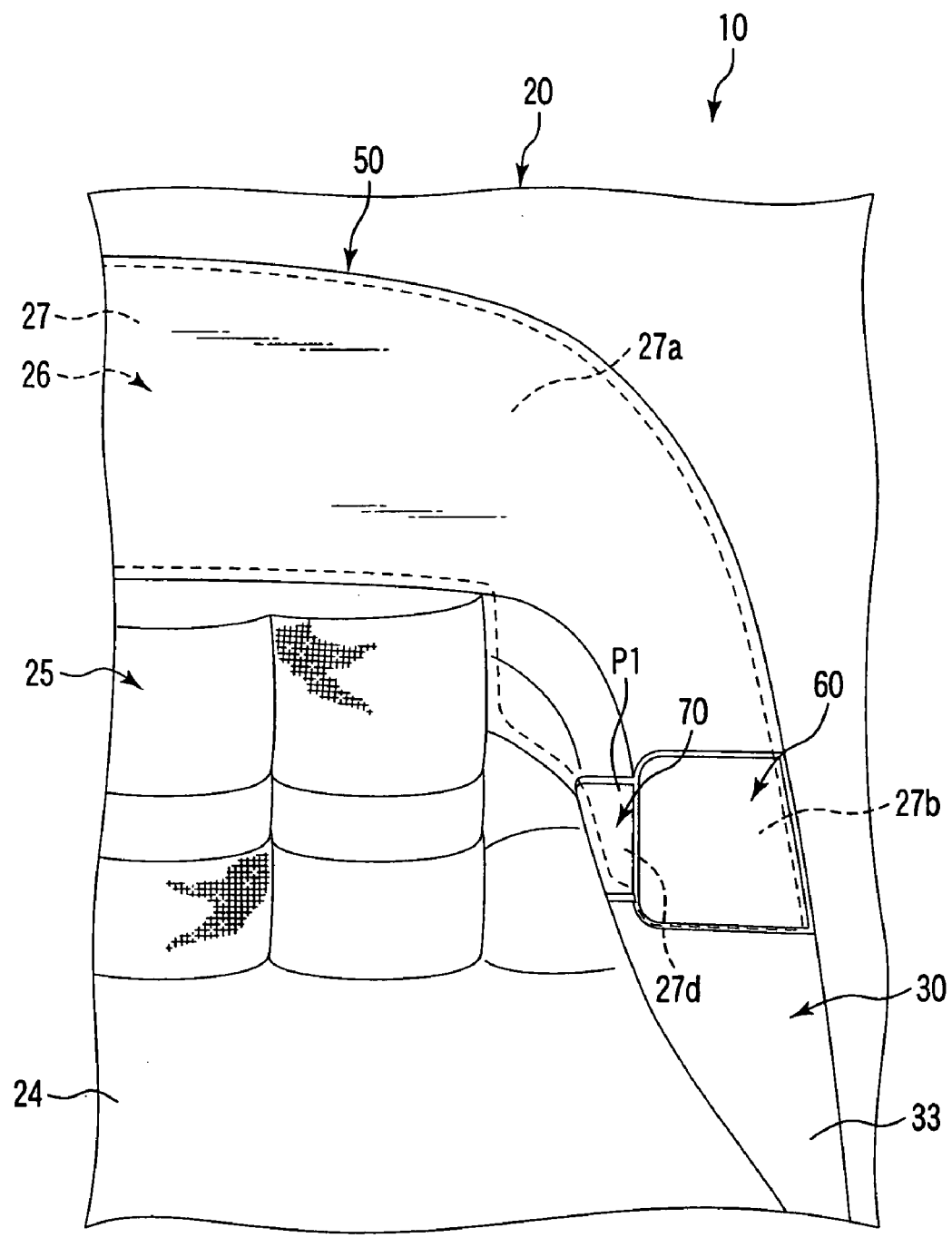
FIG. 3 is a plan view showing the vicinity of the left side of a rear seat shown in FIG. 2.

FIG. 3 is a plan view of the vicinity of the left side of the rear seat 25. As shown in FIGS. 2 and 3, a quarter trim section 30 is provided on both sides of the rear seat 25 in the vehicle main body 20.

As shown in FIG. 2, the quarter trim section 30 includes a quarter trim inner 31, a quarter trim outer 32, and a quarter trim upper 33. The quarter trim inner 31 faces the vehicle compartment 24.

As shown in FIG. 1, the quarter trim outer 32 faces outside of the vehicle. As shown in FIG. 2, the quarter trim upper 33 is joined with the top edge of the quarter trim inner 31 and the top edge of the quarter trim outer 32.

The hood member 40 is installed to the vehicle main body 20 with an installation mechanism (not shown). The hood member 40 covers over the opened vehicle compartment 24 such that it is capable of opening/closing. FIG. 1 indicates a condition in which the hood member 40 is covering over the vehicle compartment 24.

Figure 4:
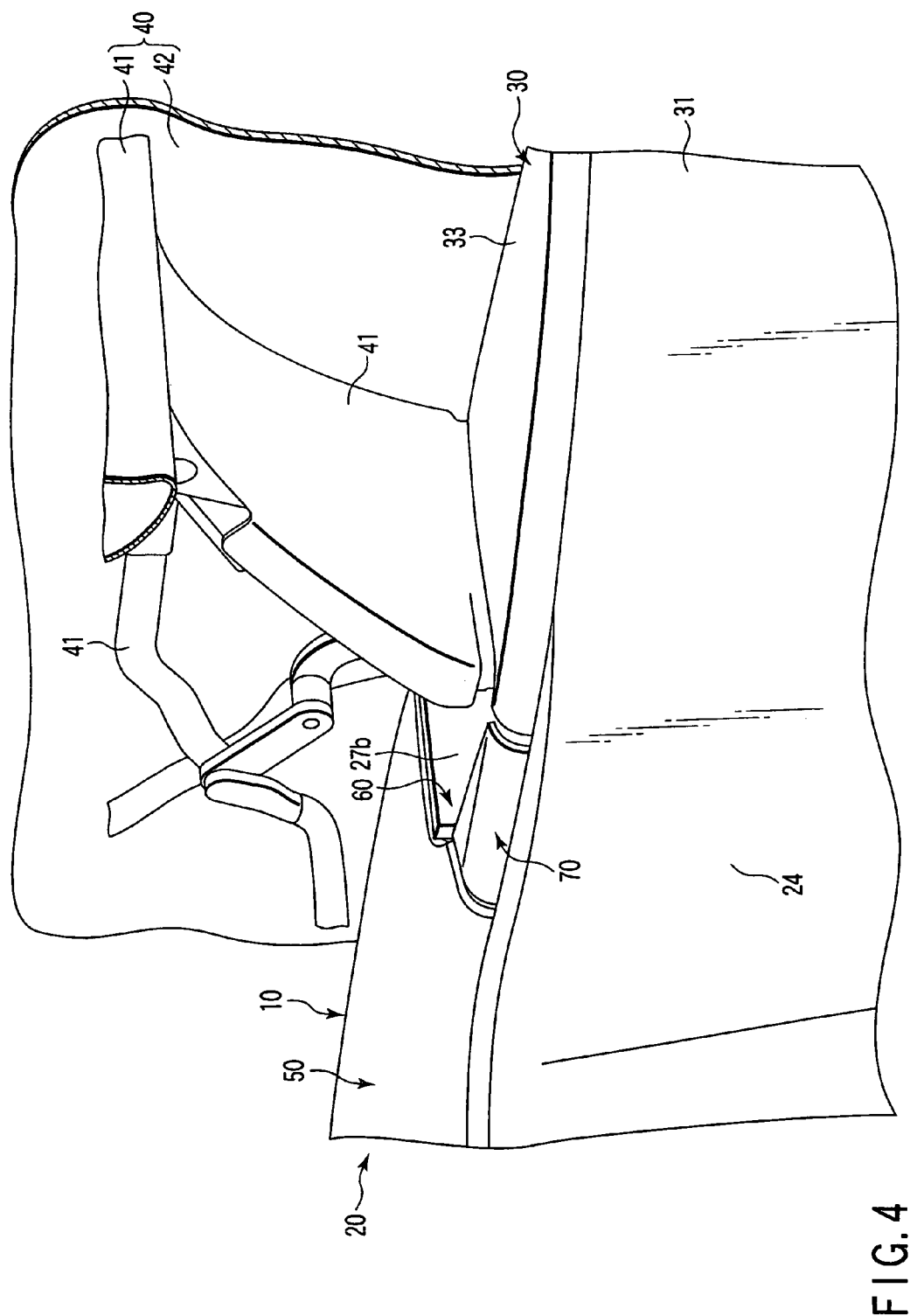
FIG. 4 is a perspective view showing the vicinity of a second range with part thereof seen as a section, in a condition in which the hood member shown in FIG. 1 covers the top of the vehicle compartment.

In FIG. 4, with the hood member 40 covering over the vehicle compartment 24, the vicinity of the second range 27b is seen from inside of the vehicle compartment 24. As shown in FIG. 4, the hood member 40 comprises a frame member 41 and a covering member 42.

The frame member 41 functions as a supporting frame for the hood member 40. The frame member 41 is foldable. The covering member 42 is installed on the frame member 41. The vehicle compartment is covered with the covering member 42.

When the vehicle compartment 24 is opened, the hood member 40 is folded down. The folded hood member 40 is accommodated in the storage section 26.

The tonneau garnish 50 is installed on the vehicle main body 20, for example, the rear section of the periphery of the opening 27 with hinges (not shown). The tonneau garnish 50 opens/closes the first range 27a of the opening 27 of the storage section 26. The tonneau garnish 50 has a size for covering the first range 27a. The tonneau garnish 50 is an example of the second door member mentioned in the present invention.

The tonneau garnish 50 rotates vertically as indicated with an arrow in FIG. 2. The opening direction of the tonneau garnish 50 goes along the back and forth direction of the vehicle body 10. By opening of the tonneau garnish 50, the first range 27a is opened.

When the hood member 40 accommodated in the storage section 26 is expanded or the expanded hood member 40 is accommodated into the storage section 26, the tonneau garnish 50 is opened.

As shown in FIGS. 2 and 3, the main door 60 covers the second range 27b of the opening 27. The double action flipper door 70 covers the third range 27d of the opening section 27. The double action flipper door 70 is an example of the first door member mentioned in the present invention.

As shown in FIG. 4, the second range 27b is passed through by part of the expanded hood member 40. The expanded hood member 40 does not pass through the third range 27d.

In FIG. 5, the quarter trim inner 31 is seen from outside. FIG. 6 shows the range of F6 shown in FIG. 5 in enlargement. The rear end section of the main door 60 is installed on the front end section of the tonneau garnish 50 with an installation mechanism (not shown). As shown in FIG. 6, the main door 60 is rotated by the installation mechanism in the back and forth direction as indicated with an arrow A in the same Figure.

When the hood member 40 is expanded as shown in FIG. 4, the main door 60 is rotated so as to be brought into the storage section 26 by the installation mechanism.

The opening/closing mechanism 80 opens/closes the double action flipper door 70. As shown in FIG. 5, the opening/closing mechanism 80 includes an opening/closing mechanism main body 81, the tonneau garnish 50 and a rotation control mechanism 87. That is, according to this embodiment, the tonneau garnish 50 also functions as a component of the opening/closing mechanism 80.

Figure 9:
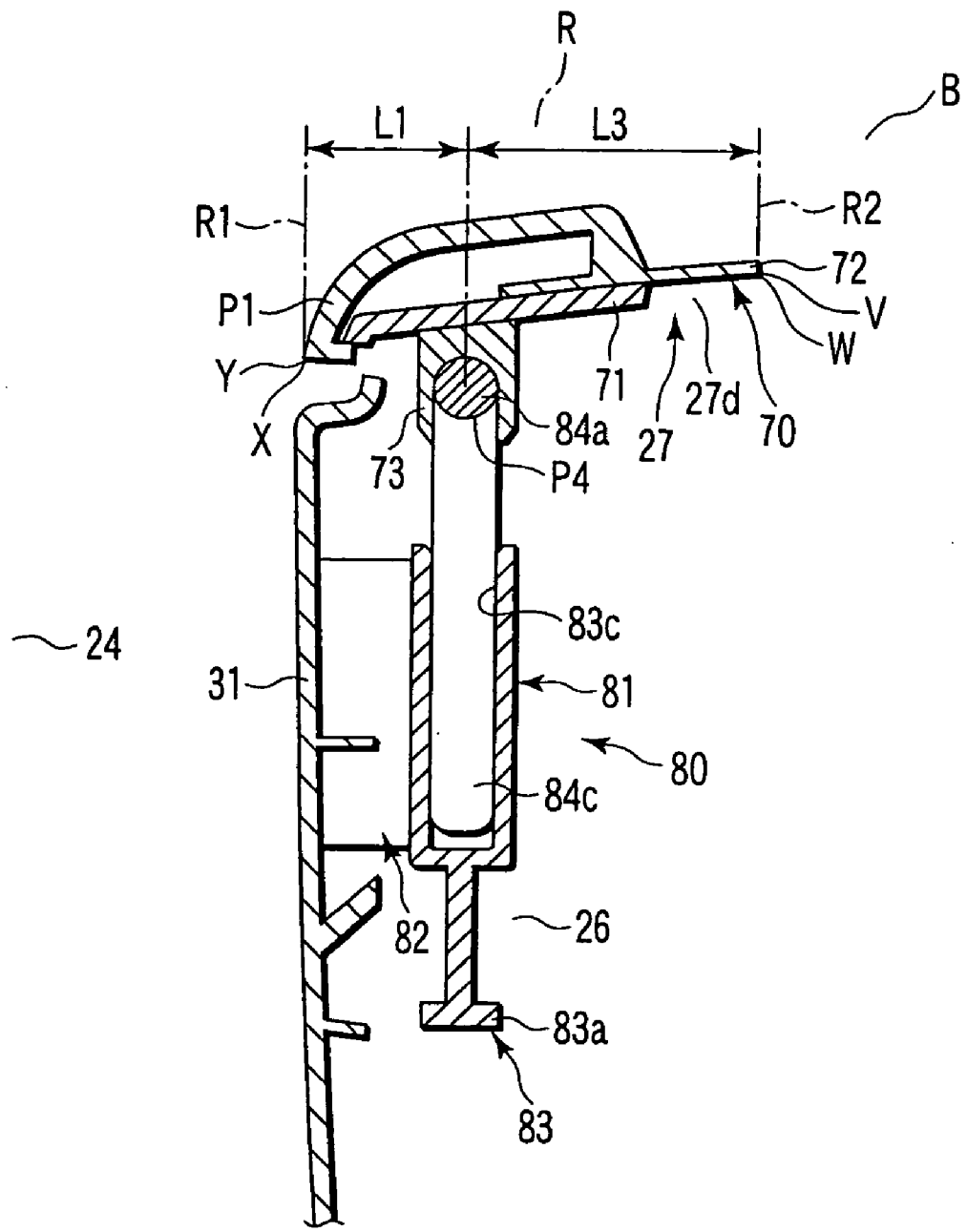
FIG. 9 is a sectional view of a double action flipper door, quarter trim inner and opening/closing mechanism main body, taken along the vehicle width when the double action flipper door shown in FIG. 2 is located at a first position.
Figure 10:
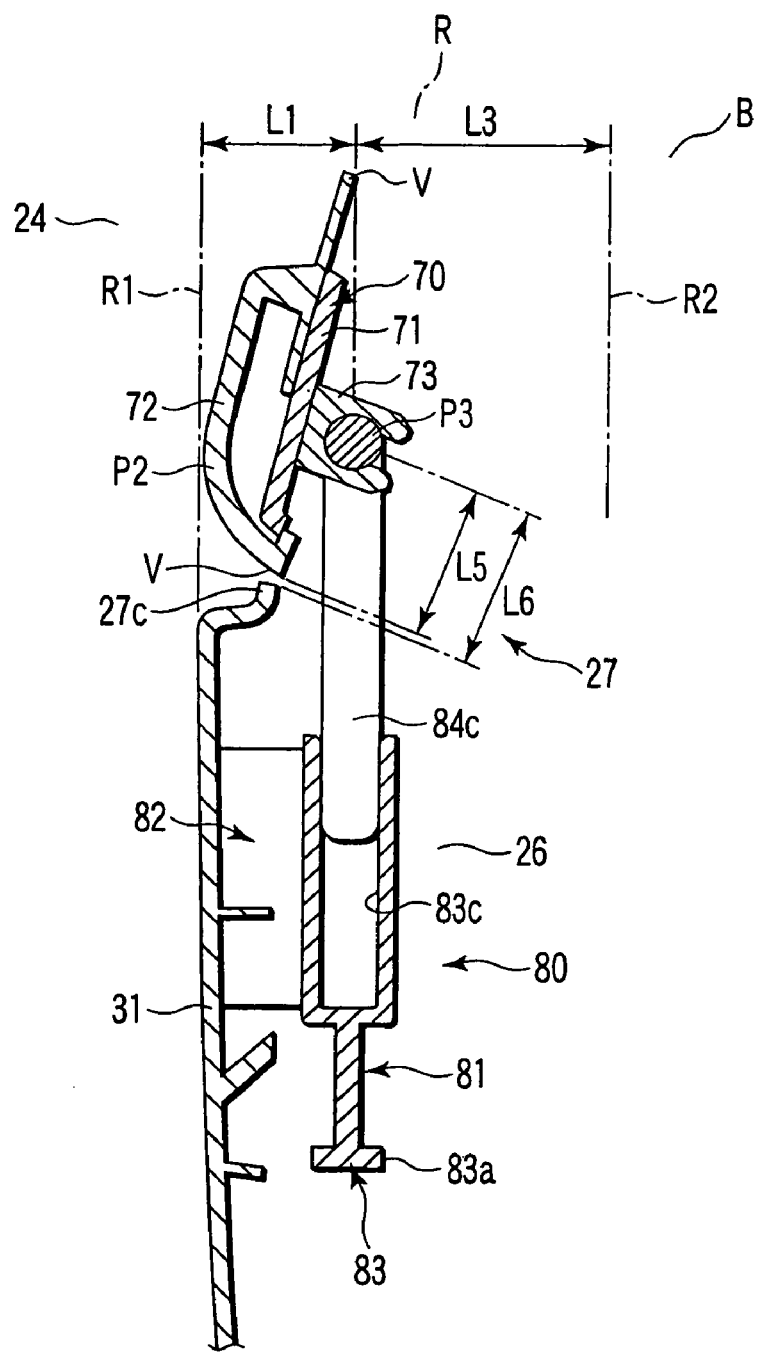
FIG. 10 is a sectional view of a double action flipper door, quarter trim inner and opening/closing mechanism main body, taken along the vehicle width when the double action flipper door shown in FIG. 2 is located at a second position.

The opening/closing mechanism main body 81 is installed on a fixing section 82 provided on the outer side of the quarter trim inner 31. The fixing section 82 is shown in FIGS. 9 and 10. The opening/closing mechanism main body 81 is accommodated in the quarter trim section 30.

Figure 7:
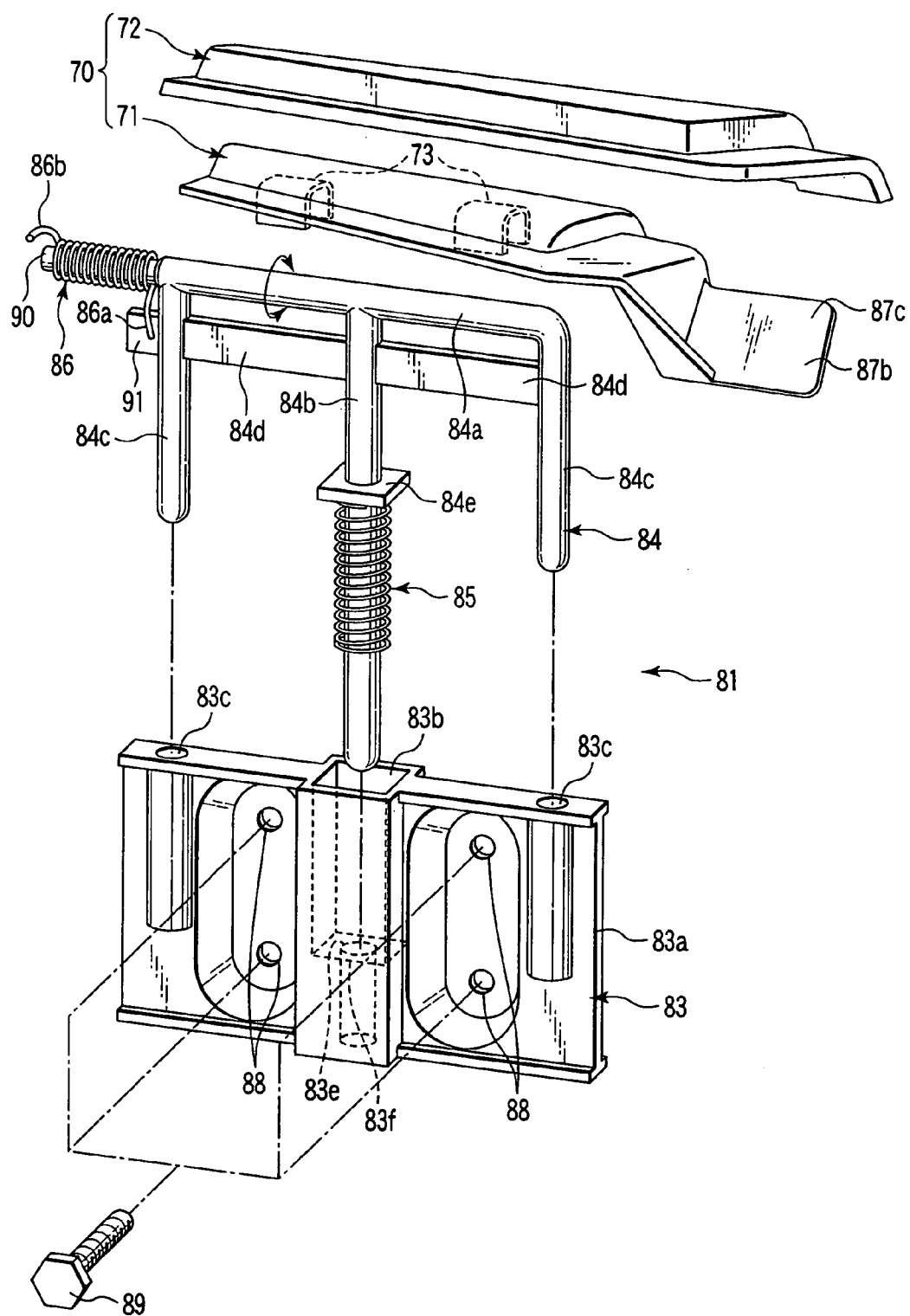
FIG. 7 is a perspective view showing an opening/closing mechanism main body shown in FIG. 6 in disassembly condition.

FIG. 7 shows a condition in which the opening/closing mechanism main body 81 is disassembled. As shown in FIG. 7, the opening/closing mechanism main body 81 includes a base member 83, an urged member 84, a first urging member 85 and a second urging member 86.

The base member 83 includes a main body section 83a, a first accommodation section 83b and a pair of second accommodation sections 83c.

The main body section 83a is a substantially flat plate extending, for example, in the back and forth direction. Bolt through holes 88 are formed at positions off substantially center in the back and forth direction of the main body section 83a. Screw holes (not shown) are formed in the fixing section 82. A female screw is formed in the screw hole. The main body section 83a is installed on the fixing portion 82 with bolts 89. The bolt 89 engages the screw hole after it passes through the bolt through hole 88.

The first accommodation section 83b is provided substantially in the center in the back and forth direction of the main body section 83a. The first accommodation section 83b is provided throughout from the top end of the main body section 83a to the bottom end thereof. The top end of the first accommodation section 83b is open. A first spring receiving section 83e is provided within the first accommodation section 83b.

The second accommodation sections 83c are provided in the main body section 83a. The second accommodation sections 83c are provided each on both sides across the first accommodation section 83b. The top ends of the second accommodation sections 83c are open.

The urged member 84 includes a rotation shaft 84a, a first guide section 84b, a pair of second guide sections 84c and a reinforcement section 84d. The rotation shaft 84a is, for example, a rod having a circular section, extending in the back and forth direction of the vehicle body 10.

The first guide section 84b is provided substantially in the center in the back and forth direction of the rotation shaft 84a. The first guide section 84b is, for example, a bar, extending downward from the rotation shaft 84a.

The first guide section 84b is accommodated in the first accommodation section 83b. A second spring receiving section 84e is formed substantially in the center in the vertical direction of the first guide section 84b. The second spring receiving section 84e is expanded in the peripheral direction of the first guide section 84b. The second spring receiving section 84b is as large as can be accommodated in the first accommodation section 83b.

The second guide sections 84c are provided on the rotation shaft 84a. The second guide sections 84c are provided each on both sides of the first guide section 84b. More specifically, when the first guide section 84b is accommodated in the first accommodation section 83b, each of the second guide sections 84c is provided at a position opposing the second accommodation section 83c.

Each of the second guide sections 84c is, for example, a bar. Each of the second guide sections 84c extends downward from the rotation shaft 84a. Each of the second guide sections 84c is accommodated in the opposing second accommodation section 83c. The first and second guide sections 84b, 84c guide motion in the vertical direction of the urged member 84.

The reinforcement section 84d is joined with the first guide section 84b and each of the second guide sections 84c. The reinforcement section 84d extends substantially in parallel to the rotation shaft 84a. The reinforcement section 84d reinforces the urged member 84.

An end section on one second guide section 84c of the rotation shaft 84a, for example, a front end section 90 of the rotation shaft 84a projects forward of the second guide section 84c.

The first urging member 85 is, for example, a coil spring. The first urging member 85 is provided downward of the second spring receiving section 84e on the first guide section 84b. If the first guide section 84b is accommodated within the first accommodation section 83b, the first urging member 85 makes contact with the first spring receiving section 83e.

A through hole 83f through which the first guide section 84b passes is formed in the first spring receiving section 83e. The through hole 83f goes through the first accommodation section 83b. The first urging member 85 is sandwiched between the first spring receiving portion 83e and the second spring receiving section 84e. Thus, the urged member 84 is urged upward by the first urging member 85.

The second urging member 86 is, for example, a torsion coil spring. The second urging member 86 is provided on the front end section 90 of the rotation shaft 84a. The second guide section 84c located on the side of the front end section 90 is provided with a third spring receiving section 91.

The third spring receiving section 91 projects forward from the second guide section 84c. An end section 86a of the second urging member 86 is in contact with the third spring receiving section 91.

As shown in FIG. 6, the rotation control mechanism 87 includes a first section 87a and a second section 87b. The first section 87a is provided on an inner face 51 of the tonneau garnish 50. The inner face 51 is a face which makes contact with the storage section 26 when the tonneau garnish 50 is closed.

The first section 87a is a bar. The first section 87a extends downward when the tonneau garnish 50 is closed.

The double action flipper door 70 will be described. As shown in FIG. 7, the double action flipper door 70 includes a first member 71 and a second member 72. The second member 72 is fixed to the top of the first member 71.

The first member 71 is a little wider than the third range 27d. More specifically, the first member 71 invades the second range 27b a little. A section invading the second range 27b of the first member 71 has a function of supporting the main door 60 from beneath.

The double action flipper door 70 is installed on the rotation shaft 84a so that it is capable of rotating freely around the rotation shaft 84*a* of the urged member 84. Thus, a pair of supporting sections 73 are provided on the first member 71. The supporting sections 73 are expressed with dotted lines in the same Figure.

Each supporting section 73 is supported by the rotation shaft 84*a*. The respective supporting portions 73 are spaced in the back and forth direction. Each supporting section 73 has, for example, a concave shaped section. As shown in FIG. 6, each supporting section 73 sandwiches the rotation shaft 84*a*.

The installation structure for installing the double action flipper door 70 to the rotation shaft 84*a* is not restricted to the above-described structure constituted of the supporting sections 73. The requirement of the installation structure for installing the double action flipper door 70 to the rotation shaft 84*a* is to allow the double action flipper door 70 to rotate freely around the rotation shaft 84*a*.

Here, respective rotation positions of the double action flipper door 70 will be described in detail. As described above, the double action flipper door 70 can rotate freely around the rotation shaft 84*a* of the urged member 84.

As shown in FIGS. 2 and 4, the double action flipper door 70 covers the third range 27*d* when the hood member 40 is accommodated within the storage section 26 or the hood member 40 is expanded.

Figure 8:
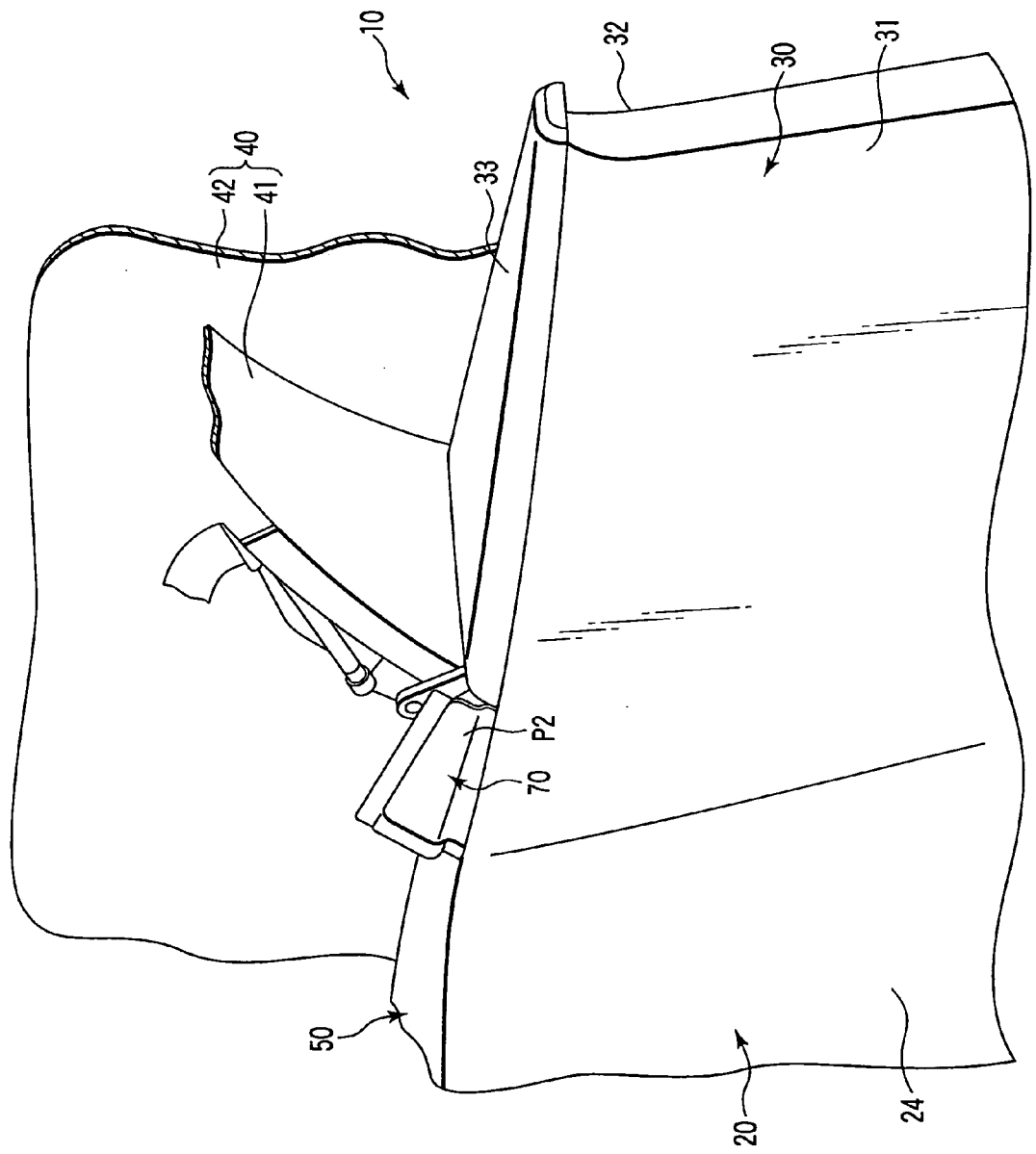
FIG. 8 is a perspective view showing halfway of expansion of the hood member shown in FIG. 1.

FIG. 8 shows the hood member 40 being expanded. As shown in FIG. 8, the double action flipper door 70 stands from the vehicle main body 20 so as to open the third range 27*d* while the hood member 40 is being expanded or the hood member 40 is being folded down.

That is, the double action flipper door 70 rotates between a first position P1 in which it covers the third range 27*d* and a second position P2 in which it stands up so as to open the third range 27*d*. The double action flipper door 70 is erected during that operation not preventing the expansion operation or storage operation of the hood member 40.

Here, the positional relation between the rotation shaft 84*a* of the urged member 84 and the double action flipper door 70 will be described specifically. FIG. 9 is a sectional view of the double action flipper door 70, the quarter trim inner 31 and the opening/closing mechanism main body 81 in the vehicle width direction in a condition in which the double action flipper door 70 is located at the first position P1. In FIG. 9, the main door 60 is omitted.

An area which overlaps the double action flipper door 70 vertically when the double action flipper door 70 is located at the first position P1, that is, the double action flipper door 70 is closed as shown in FIG. 9, is assumed to be a rotation area R. The rotation area R is an area surrounded by two dot and dash line in the same Figure.

FIG. 10 shows a section of the vehicle body 10 like FIG. 9 when the double action flipper door 70 is located at the second position P2.

As shown in FIG. 10, the rotation shaft 84*a* of the urged member 84 is disposed at a position designed to prevent the double action flipper door 70 from going out of the rotation area R when the double action flipper door 70 rotates between the first position P1 and the second position P2.

The double action flipper door 70 has a thickness. Thus, when the rotation shaft is located at an end section of the double action flipper door 70, it can be considered that the area which overlaps the double action flipper door 70 vertically may deflect from the rotation area R by an amount corresponding to the thickness of the double action flipper door 70.

For this reason, the rotation shaft 84*a* of the urged member 84 is disposed to be located substantially in the center in the vehicle width direction of the double action flipper door 70 located at the first position P1, preventing the double action flipper door 70 from going out of the rotation area R, when the double action flipper door 70 moves between the first position P1 and the second position P2.

More specifically, the rotation shaft 84*a* is disposed so that distance $L1 \geq$ distance $L2$. As shown in FIG. 9, the distance L1 is a distance along the vehicle width from an end section Y on the side of the vehicle compartment 24 of the double action flipper door 70 located at the first position P1 up to the rotation shaft 84*a*. That is, the distance L1 is a distance along the vehicle width from a border R1 of the rotation area R on the side of the vehicle compartment 24 up to the rotation shaft 84*a*.

The distance L2 is a distance along the vehicle width from a position X in which the double action flipper door 70 projects most to the side of the vehicle compartment 24 up to the rotation shaft 84*a* when the double action flipper door 70 moves between the first position P1 and the second position P2. According to this embodiment, the end section Y is the position X. Thus, it comes that L1=L2.

The rotation shaft 84*a* is disposed to obtain the relation of $L2 \leq L1$ for the double action flipper door 70 to rotate within the rotation area R.

Further, the rotation shaft 84*a* is disposed to obtain the relation of distance $L3 \geq$ distance $L4$ to prevent the double action flipper door 70 from going into an area B on an opposite side to the vehicle compartment 24 across the rotation area R, when the double action flipper door 70 rotates.

The distance L3 is a distance along the vehicle width from an end section V on the side of the area B of the double action flipper door 70 located at the first position P1 up to the rotation shaft 84*a*. That is, the distance L3 is a distance from a border R2 of the rotation area R on the side of the area B up to the rotation shaft 84*a*.

The distance L4 is a distance along the vehicle width from a position W in which the double action flipper door 70 projects most to the side of the area B up to the rotation shaft 84*a* when the double action flipper door 70 moves between the first position P1 and the second position P2. According to this embodiment, the end section V is the position W. Thus, it comes that L3=L4.

The vehicle width direction is a direction which intersects the axis of the rotation shaft 84*a* and the vertical direction. That is, the aforementioned distances L1, L2, L3, L4 are distances along a direction intersecting the axis of the rotation shaft 84*a* and the vertical direction. Therefore, the rotation shaft 84*a* is disposed at a position P4 in which $L2 \leq L1$ and $L3 \geq L4$.

If the double action flipper door 70 is installed on the rotation shaft 84*a*, the other end section 86*b* of the second urging member 86 makes contact with the first member 71. As described above, the second urging member 86 is a torsion coil spring. The second urging member 86 urges the double action flipper door 70 in a direction of opening it.

The second section 87*b* of the rotation control mechanism 87 is provided on the first member 71, as shown in FIG. 7. As shown in FIG. 6, when the tonneau garnish 50 is closed, the second section 87*b* makes contact with the first section 87*a*.

By contact between the first section 87*a* and the second section 87*b*, the degree of opening of the tonneau garnish 50 is transmitted to the urged member 84. That is, if the tonneau garnish 50 is opened, the urged member 84 is moved upward by elastic force of the first urging member 85 and if the tonneau garnish 50 is closed, the urged member 84 is closed.

Thus, when the tonneau garnish 50 is closed, the urged member 84 is pressed downward resisting an urging force of the first urging member 85 via the first section 87a. As a consequence, the first urging member 85 is compressed between the first spring receiving section 84e and the second spring receiving section 83e. The urged member 84 is urged by the first urging member 85.

A range of the second section 87b which makes contact with the first section 87a is a substantially flat surface. Then, this face 87c tilts in a direction intersecting the vertical direction. The face 87c tilts so that its top section is located nearer the vehicle compartment 24 than the bottom section.

Here, the tilt of the face 87c and a range of the double action flipper door 70 urged upward by the first urging member 85 will be explained specifically.

The tilt of the face 87c is considered for the double action flipper door 70 to be held at the first position P1 when the tonneau garnish 50 is closed.

That is, the tile of the face 87c is considered for the double action flipper door 70 urged rotatably in a direction of opening to be held at the first position P1 when the first section 87a of the tonneau garnish 50 makes contact with the face 87c.

The rotation shaft 84a of the urged member 84 is located substantially in the center in the vehicle width of the double action flipper door 70 located at the first position P1. Thus, the length of the first urging member 85 is set up so that when the double action flipper door 70 rotates, the double action flipper door 70 can move upward on the rotation shaft 84a up to the third position P3 in which end sections in the vehicle width of the double action flipper door 70 do not make contact with the vehicle main body 20 such as the edge of the opening 27.

Until the rotation shaft 84a reaches the third position P3, contact condition between the first section 87a and the second section 87b is kept in the same condition as when the double action flipper door 70 is located at the first position P1. Therefore, until the rotation shaft 84a reaches the third position P3, the double action flipper door 70 does not rotate.

That is, when the double action flipper door 70 is located at the second position P2, the rotation shaft 84a is located at the third position P3.

According to this embodiment, it can be considered that an end section Y of the double action flipper door 70 makes contact with an edge 27c of the opening 27. As shown in FIG. 10, a distance from the end section Y of the double action flipper door 70 up to the rotation shaft 84a when the rotation shaft 84a is located at the third position P3 is assumed to be L5. A distance from the edge 27c of the opening 27 up to the rotation shaft 84a when the rotation shaft 84a is located at the third position P3 is assumed to be L6.

The third position P3 is set up so that L6≧L5 for the double action flipper door 70 not to interfere with the edge section 27c.

In the meantime, a position which the double action flipper door 70 can make contact with when the double action flipper door 70 rotates differs depending on the shape of the double action flipper door 70 or the shape of the vehicle main body 20.

In such a case, the third position P3 is set up for the double action flipper door 70 not to make contact with the vehicle main body 20.

Figure 11:
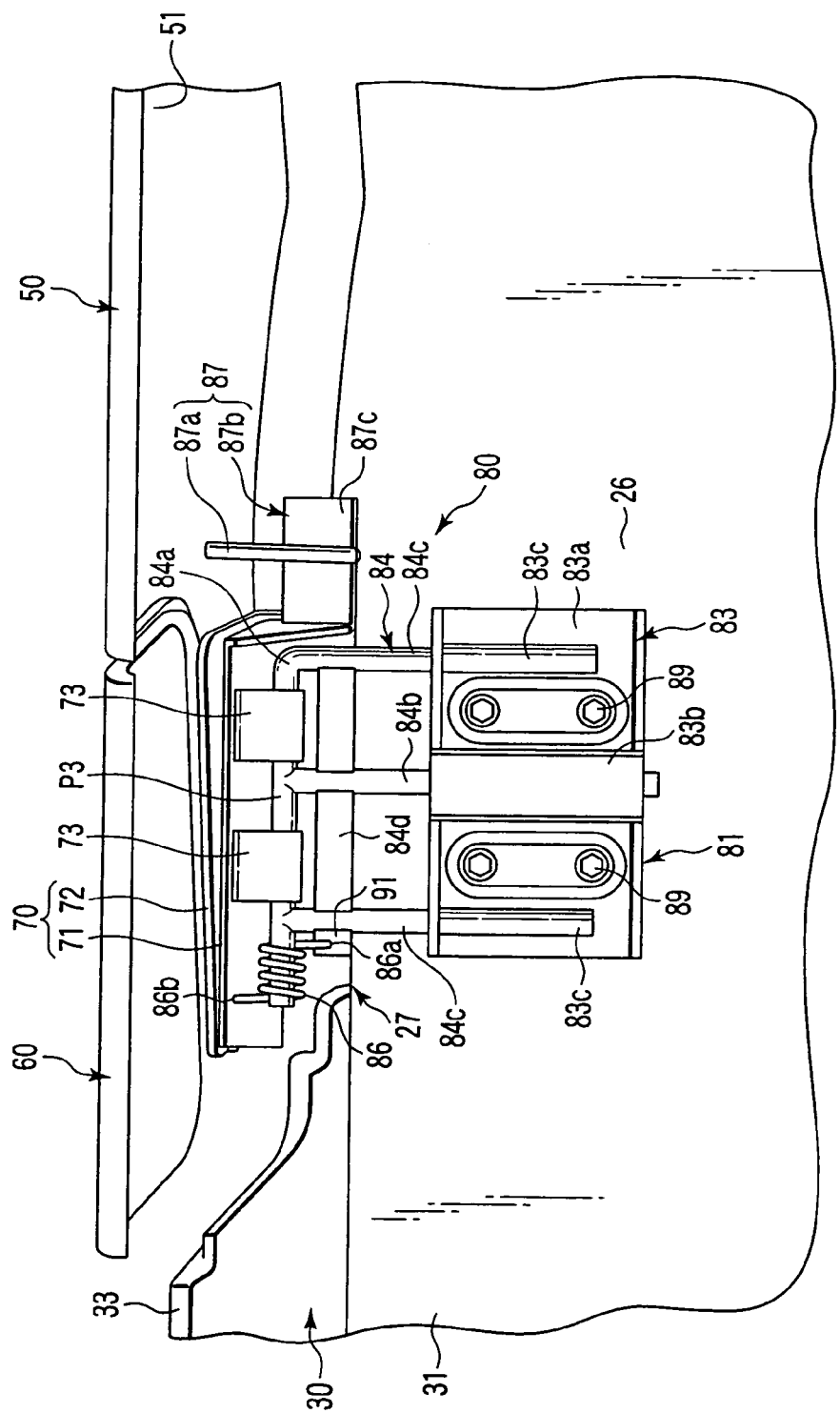
FIG. 11 is a perspective view showing a condition in which the double action flipper door shown in FIG. 2 is located at a third position.

FIG. 11 shows a condition in which the rotation shaft 84a is located at the third position P3. As shown in FIG. 11, the contact between the first section 87a and the face 87c is maintained for the double action flipper door 70 not to rotate even if the double action flipper door 70 moves upward accompanied by the opening motion of the tonneau garnish 50 until the rotation shaft 84a reaches the third position P3.

Next, the operations of the opening/closing mechanism 80 and the double action flipper door 70 when the tonneau garnish 50 is opened will be described.

In a condition in which the hood member 40 is accommodated in the storage section 26 as shown in FIG. 2, the tonneau garnish 50 covers the first range 27a of the opening 27 while the main door 60 and the double action flipper door 70 cover the second, third ranges 27b, 27d. As shown in FIGS. 6 and 9, the double action flipper door 70 is located at the first position P1.

When the hood member 40 is expanded or taken into the storage section, the tonneau garnish 50 is opened. When the tonneau garnish 50 is being opened, the first section 87a also moves upward. Thus, the urged member 84 is moved upward by the first urging member 85.

As shown in FIG. 11, the double action flipper door 70 does not rotate until the rotation shaft 84a reaches the third position P3. Thus, the double action flipper door 70 is located within the rotation area R.

Figure 12:
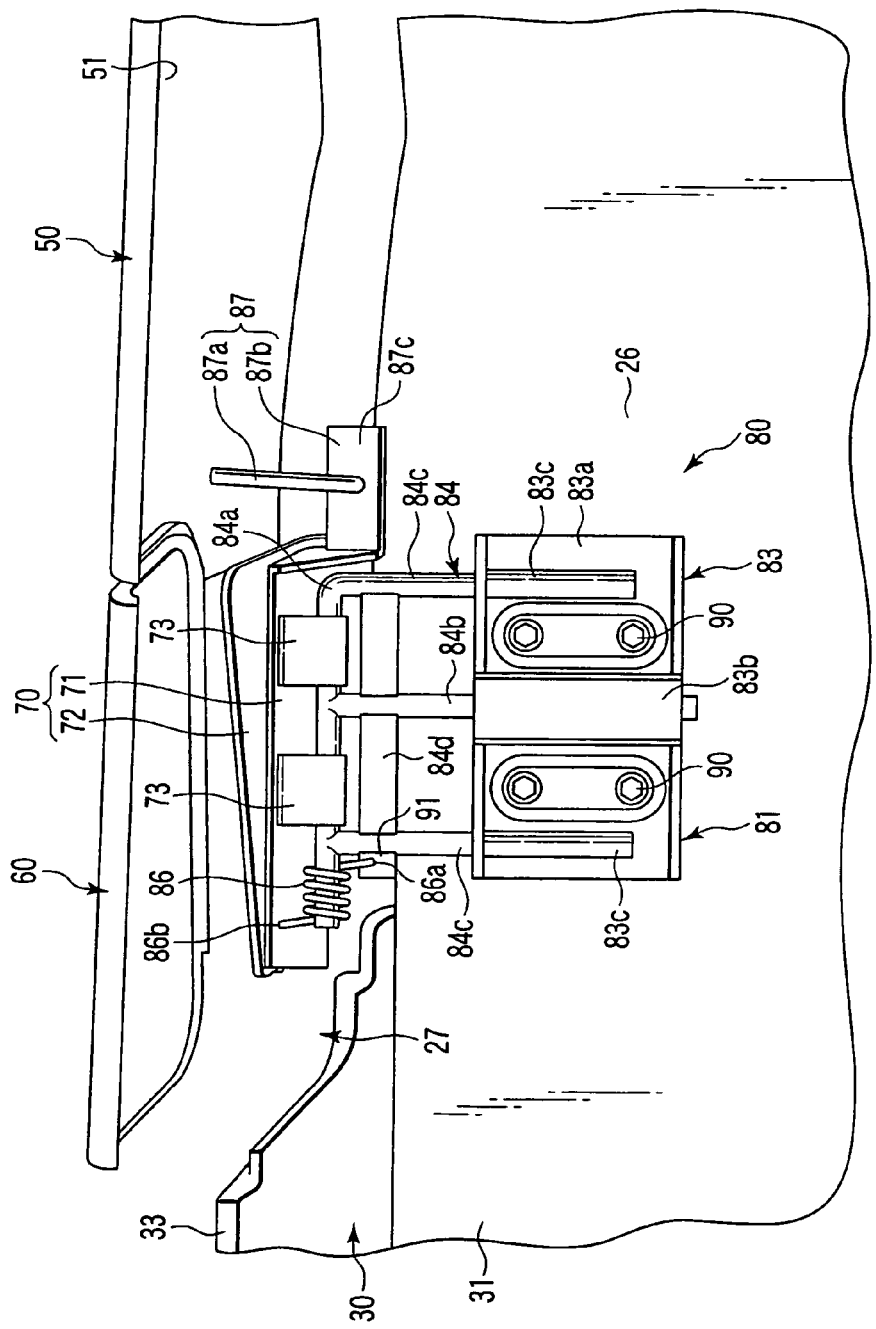
FIG. 12 is a perspective view showing a condition in which after the double action flipper door shown in FIG. 2 reaches the third position, further, a tonneau garnish is opened.

FIG. 12 shows a condition in which the tonneau garnish 50 is opened further after the rotation shaft 84a reaches the third position P3. Even if the tonneau garnish 50 is opened further after the rotation shaft 84a reaches the third position P3 as shown in FIG. 12, the urged member 84 is not urged upward.

Thus, if the tonneau garnish 50 is opened further after the rotation shaft 84a reaches the third position P3, the first section 87a leaves the second section 87b.

The face 87c of the second section 87b tilts as described above. Thus, the double action flipper door 70 opens as the first section 87a leaves the second section 87b. At this time, the first section 87a slides relatively downward of the face 87c.

Figure 13:
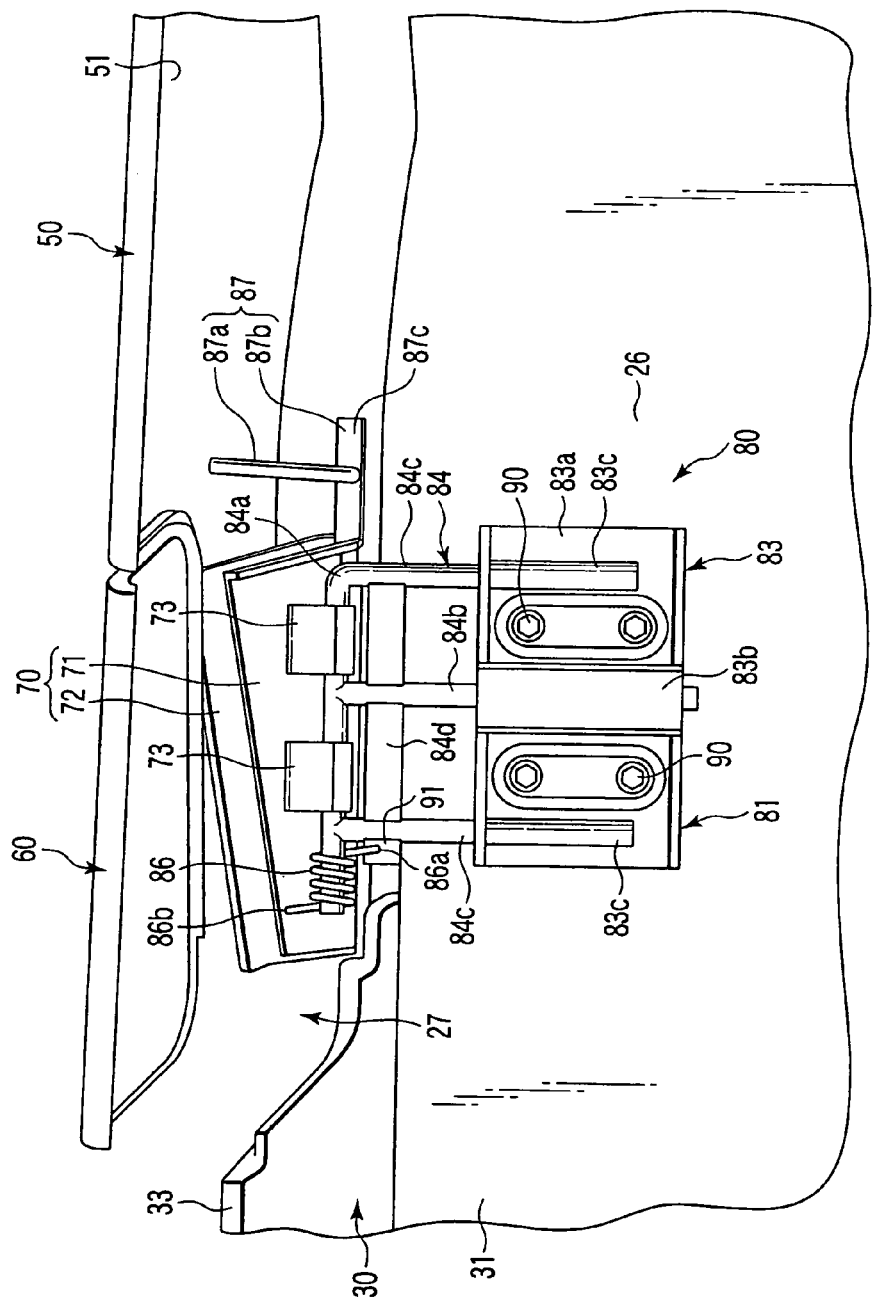
FIG. 13 is a perspective view showing a condition in which the tonneau garnish is kept open until the first section shown in FIG. 6 reaches the bottom end of the second section.
Figure 14:
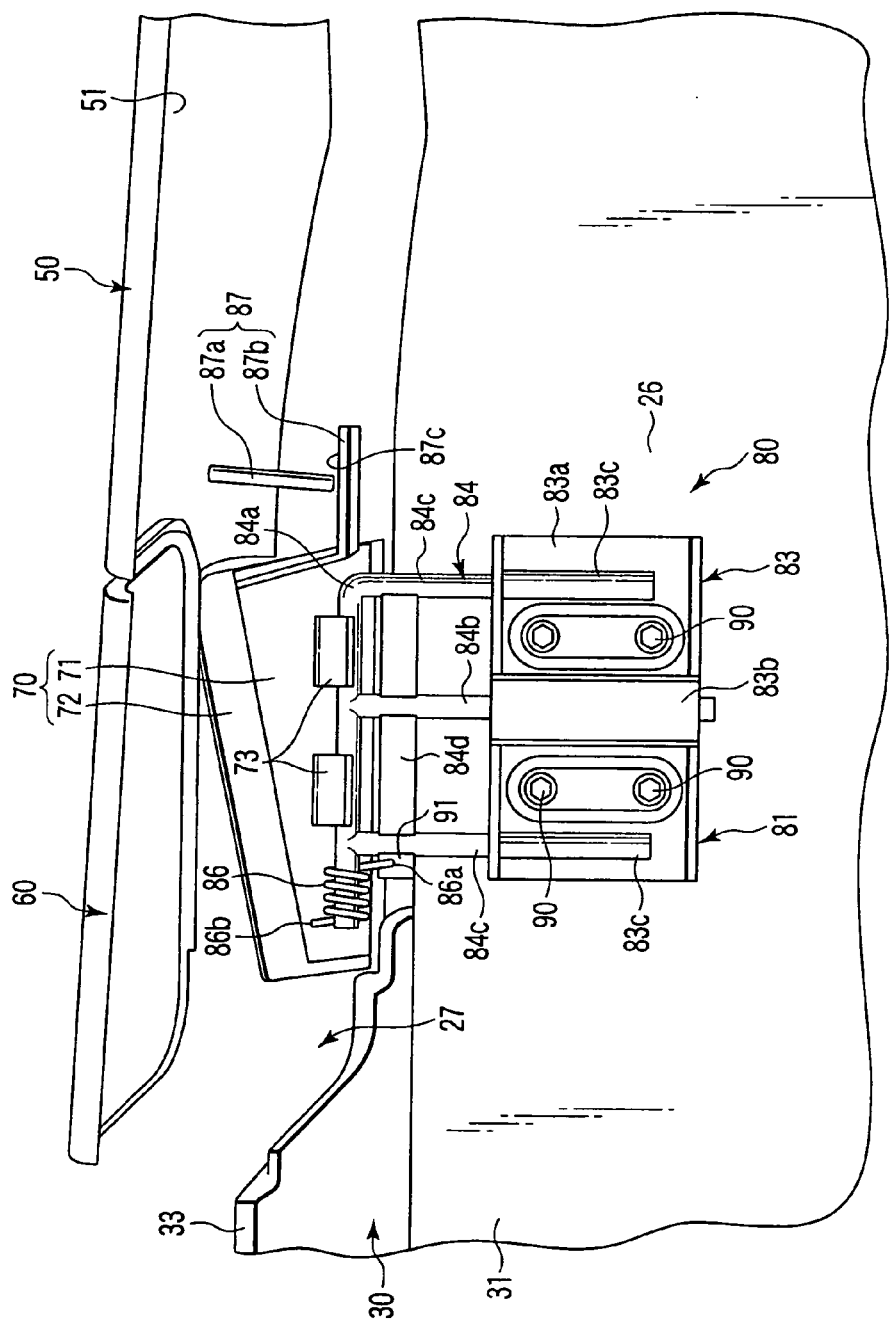
FIG. 14 is a perspective view showing a condition in which the tonneau garnish is kept open until the first section shown in FIG. 6 leaves the second section.

After the first section 87a slides until it reaches the bottom end of the second section 87b as shown in FIG. 13, the first section 87a leaves the second section 87b as shown in FIG. 14. At this time, the double action flipper door 70 has reached the second position P2. When the double action flipper door 70 is located at the second position P2 as shown in FIG. 10, the double action flipper 70 is not out of the rotation area R.

Next, the operations of the opening/closing mechanism 80 and the double action flipper door 70 when the tonneau garnish 50 is closed will be described.

When the tonneau garnish 50 is opened, the double action flipper door 70 is located at the second position P2. While the tonneau garnish 50 is being closed, the first section 87a makes contact with the face 87c of the second section 87b as shown in FIG. 13.

If the tonneau garnish 50 is closed further as shown in FIG. 12, the double action flipper door 70 begins to rotate in the direction of closing from the second position P2.

If the tonneau garnish 50 is closed further as shown in FIG. 11, the rotation of the double action flipper door 70 is stopped.

If the tonneau garnish 50 is closed up to a position in which it covers the first range 27a of the opening 27 as shown in FIG. 6, the double action flipper door 70 is pushed downwardly until the double action flipper door 70 reaches the firs position P1.

In the vehicle body 10 constructed in the above way, the position of the rotation shaft 84a of the urged member 84 is considered so that the double action flipper door 70 does not come out of the rotation area R when the double action flipper door 70 rotates between the first position P1 and the second position P2.

Further, the opening/closing mechanism 80 moves the rotation shaft 84$a$ up to the third position P3 for the double action flipper door 70 not to make contact with the vehicle main body 20, for example, the edge 27$c$ of the opening 27 when the double action flipper door 70 rotates between the first position P1 and the second position P2.

By considering the position of the rotation shaft 84$a$ of the urged member 84 and moving the rotation shaft 84$a$ upward as described above, the double action flipper door 70 can rotate within the rotation area R.

That is, the double action flipper door 70 is prevented from interfering with the surrounding such as the vehicle main body 20.

As a result, the double action flipper door 70 never invades the vehicle compartment 24 when the hood member 40 is expanded or accommodated thereby eliminating such a fault as collision of the double action flipper door 70 with a passenger.

Likewise, the double action flipper door 70 never comes out 10 from the rotation area R toward the out side of the vehicle body when it rotates between the first position P1 and the second position P2. Thus, when the double action flipper door 70 rotates, the double action flipper door 70 is prevented from making contact with the vehicle body 10 or an object located out of the vehicle body 10.

Further, the opening/closing mechanism 80 includes the tonneau garnish 50. Thus, the double action flipper door 70 can be opened/closed effectively interlocking with the opening/closing motion of the tonneau garnish 50.

The opening/closing mechanism 80 includes the first guide section 84$b$ and a pair of the second guide sections 84$c$. Thus, the vertical movement of the urged member 84 is achieved smoothly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle body comprising:
   a vehicle main body which comprises a vehicle compartment and a storage section, a top of the vehicle compartment being opened, and the storage section having an opening;
   a hood member which covers the top of the vehicle compartment such that it is capable of opening/closing, the hood member being accommodated in the storage section through the opening when the top of the vehicle compartment is opened;
   a first door member which covers at least part of the opening, the first door member being capable of rotating between a first position in which it covers part of the opening and a second position in which it stands from the vehicle main body and opens part of the opening; and
   an opening/closing mechanism which rotates the first door member and comprises a rotation shaft supporting the first door member rotatably,
   wherein the rotation shaft is disposed at a position in which the first door member does not come out of a rotation area overlapping, in vertical direction, the first door member which is in the first position when the first door member rotates between the first position and the second position, and
   the rotation shaft moves up to a third position in which the first door member does not interfere with the vehicle main body when the first door member rotates between the first position and the second position.

2. The vehicle body according to claim 1, wherein the opening/closing mechanism comprises:
   an urging mechanism which urges the rotation shaft toward the third position and the first door member in the direction of opening;
   a second door member which covers at least a part of that region of the opening which is other than the region covered by the first door member and which is capable of opening and closing the opening; and
   a rotation control mechanism which controls the rotation of the first door member, the rotation control mechanism comprising a first section provided on the second door member and a second section provided on the first door member, which keeps contact with the first section to prevent the first door member from rotating until the rotation shaft reaches a third position.

3. The vehicle body according to claim 2, wherein the urging mechanism comprises:
   a first urging member which urges the rotation shaft toward the third position; and
   a second urging member which urges the first door member in the direction of opening.

4. The vehicle body according to claim 3, wherein the urging mechanism comprises a guide section which guides the movement of the rotation shaft.

5. The vehicle body according to claim 4, wherein the rotation shaft and the guide section are formed integrally.

6. The vehicle body according to claim 5, wherein
   the urging mechanism comprises an accommodation section which accommodates the guide section movably,
   the first urging member is a coil spring,
   the guide section is provided with a first spring receiving section,
   a second spring receiving section is provided within the accommodation section, and
   the first urging member is provided between the first spring receiving section and the second spring receiving section.

7. The vehicle body according to claim 3, wherein
   the second urging member is a torsion spring,
   the urged member is provided with a spring receiving section which supports an end of the second urging member, and
   an other end of the second urging member is supported by the first door member.

* * * * *